United States Patent Office 3,053,856
Patented Sept. 11, 1962

3,053,856
EPOXIDATION OF ETHYLENIC COMPOUNDS WITH PEROXYCARBOXIMIDIC ACIDS
George B. Payne, Berkeley, and Philip H. Deming, Orinda, Calif., assignors to Shell Oil Company, a corporation of Delaware
No Drawing. Filed Oct. 29, 1958, Ser. No. 770,260
8 Claims. (Cl. 260—348.5)

This invention relates to the epoxidation of ethylenic compounds to produce valuable products containing added oxirane oxygen. It deals with a new and more active epoxidizing agent of the peroxide type which offers advantages over the previously available epoxidizing agents.

Peroxide type epoxidizing agents have been used in a wide variety of epoxidation reactions, typical examples being hydrogen peroxide, performic and peracetic and like peracids, etc. These excellent epoxidizing agents are well known to be quite active but there are a great many cases in which they are still too slow reacting for the best results. This is especially the case in the production of epoxidation products which tend to undergo undesirable reaction during the epoxidation. The more active epoxidizing agent of the present invention is effective in reducing such side reactions by shortening the time required for the desired epoxidation. Even when side reactions are not a serious problem, the present method offers the practical advantages of increased plant throughput due to the faster reaction which it brings about. The greater activity of the new epoxidizing agent of the invention also makes its possible to carry out controlled reactions not previously feasible. Still another advantage of the invention, in one of its important modifications, is that it makes it possible to produce valuable amides along with an epoxidation product. Yet other objects and advantages of the new process will be apparent from the following description of the invention.

In accordance with the invention the epoxidation of ethylenic compounds to obtain oxirane compounds is carried out with a peroxycarboximidic acid. The peroxycarboximidic acid epoxidizing agents used are new compounds. The peroxycarboximidic acid epoxidizing agents of the invention can be made in various ways but there are special advantages, for some purposes, in producing the peroxycarboximidic acid in situ in the reaction mixture. An important modification of the invention makes use of this technique in carrying out the new epoxidation method by adding a nitrile and hydrogen peroxide to the ethylenic compound to be epoxidized, the peroxycarboximidic acid being formed from the nitrile and hydrogen peroxide and simultaneously epoxidizing the ethylenic compound to form an oxirane product and an amide. The epoxidation is advantageously carried out at a pH of at least 4 and except when epoxidizing compounds which are themselves sufficiently basic to maintain this pH, a base is usually added to the reaction mixture for this purpose.

Epoxidation of ethylenic compounds with percarboxylic acids such as performic, peracetic, perbenzoic and like acids is a widely applicable 1-step method of making oxirane compounds. While, as pointed out by Swern in "Chemical Reviews," vol. 45, pages 1–25 (1949), for example, such epoxidation can be successfully used with a great variety of ethylenic compounds, it must be conducted with care because of the tendency of the carboxylic acid present in the reaction mixture to react with the oxirane group of the product to form unwanted hydroxy ester by-products. Also the ease of epoxidation with percarboxylic acids varies greatly with the molecular structure of the ethylenic compound being epoxidized. The greater the electron density at an ethylenic bond, the greater its reactivity towards peracids. Epoxidation of fatty acids and oils occurs easily in a few hours as compared with 25-30 hours under the same conditions for terminally unsaturated compounds such as 1-tetradecene, 1-hexadecene, and 1-octadecene. The presence of an electrophilic group such as halogen, carboxyl, carbonyl, etc. at an ethylenic link tends to withdraw electrons from the double bond, and decreases reactivity. For example, allyl chloride is epoxidized much more slowly than propylene. Generally the slower the reaction the greater the tendency to form undesirable byproducts during such epoxidations with percarboxylic acids.

A special object of the invention is the provision of a method whereby ethylenic compounds which are epoxidized only slowly by percarboxylic acids can be epoxidized at a substantially faster rate with resulting improved and more economical operation. Another object is the provision of a new and advantageous method for the epoxidation of ethylenic compounds as a class including those which epoxidize rapidly as well as slowly in reactions with a percarboxylic acid. A further object is the provision of a method of epoxidation in which valuable amides are obtained as byproducts of the reaction.

As applied to the production of oxirane compounds from ethylenic compounds, the invention is carried out by reacting the ethylenic compound with a peroxycarboximidic acid at pH at least 4, the peroxycarboximidic acid epoxidizing agent being converted, at least in part, to an amide which is a valuable byproduct of the process. The reaction can be represented by the equation:

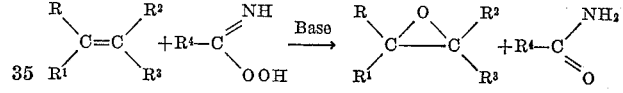

where

is the peroxycarboximidic acid epoxidizing agent being employed.

While separately preformed peroxycarboximidic acid can be successfully used in the reaction, it has been found advantageous, as previously indicated, to form the peroxycarboximidic acid epoxidizing agent in the reaction mixture. The peroxycarboximidic acid can be formed in the reaction mixture especially advantageously by reacting a nitrile with hydrogen peroxide. The over-all reaction taking place in such case is represented by the equation:

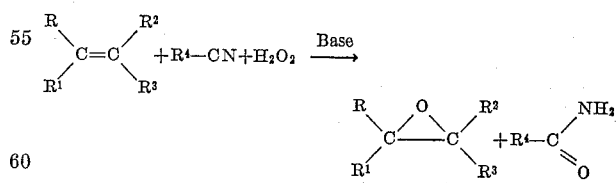

In these two equations each of the R's represents a hydrogen or an organic radical having its free bond attached to a carbon atom or any two or more of the R's linked to the ethylenic group shown can together represent a polyvalent radical in which the free bonds are each attached to different carbon atoms.

The nitriles employed in making the peroxycarboximidic acid epoxidizing agents used in the new process are those in which the nitrile group is the only group which is reactive with hydrogen peroxide. To this end it is necessary to employ starting nitriles which are free from ethylenic or acetylenic multiple bonds between carbon atoms. In other words, nitriles in which the only multiple bonds between carbon atoms are those of aromatic rings or like unreactive aromatic double bonds are especially advantageous starting materials. Saturated nitriles, particularly saturated hydrocarbon nitriles, are a useful class of starting materials. Aromatic nitriles are another advantageous sub group of starting materials for producing the peroxycarboximidic acid epoxidizing agents. Especially useful are the aromatic hydrocarbon nitriles in which the nitrile group is directly linked to an aromatic ring since these have been found to form epoxidizing agents which, as a class, are more active than the saturated nitriles and thus permit epoxidation in shorter time, giving increased plant capacity in the new process. Representative examples of nitriles of these especially advantageous types which can be used to make novel peroxycarboximidic acids for use in the new reaction are aliphatic nitriles such as acetonitriles giving peroxyacetimidic acid

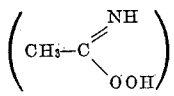

on reaction with hydrogen peroxide; propionitrile giving under the same conditions peroxypropionimidic acid; capronitrile giving peroxycapronimidic acid; caprinitrile giving peroxycaprinimidic acid; tridecanenitrile giving peroxytridecanimidic acid; and octadecanenitrile giving peroxyoctadecanimidic acid; cycloaliphatic saturated nitriles such as 1- and 4-methylcyclohexanenitriles which react with hydrogen peroxide to form peroxy 1- and 4-methylcyclohexanecarboximidic acids; cyclohexane acetonitrile which forms peroxycyclohexaneacetimidic acid; and 2-norcamphenonitrile which yields 2-norcamphenimidic acid, etc.; and aromatic nitriles such as ortho-, meta- and para-tolunitriles, which form peroxy ortho-, meta-, and para-toluimidic acids; alpha-methylbenzyl cyanide which reacts with $H_2O_2$ to give peroxy alpha-phenylpropionimidic acid; mesityl acetonitrile giving peroxy mesitylacetimidic acid; 2-cyanotetralin which yields peroxy 2-tetralincarboximidic acid; and 1-cyanoanthracene which gives peroxy 1-anthracenecarboximidic acid.

Beta-hydroxynitriles such as are readily obtainable by reacting hydrogen cyanide with oxirane compounds are another useful type of nitrile for use in the invention. Examples of such hydroxynitriles are beta-hydroxypropionitrile which forms peroxy beta-hydroxypropionimidic acid by reaction with $H_2O_2$, 2-hydroxycyclohexanenitrile which forms peroxy 2-hydroxycyclohexanecarboximidic acid, and 3-phenyl-3-hydroxypropionitrile which forms peroxy 3-phenyl-3-hydroxypropionimidic acid. Polynitriles can be used instead of mononitriles in making peroxycarboximidic acid epoxidizing agents for use in the new process. Thus for example, malonitrile; hexamethylene dicyanide; 1,4-dicyanocyclohexane, phenylsuccinonitrile, and 4,4'-dicyanobiphenyl can be employed. Polymers of unsaturated nitriles such as poly(acrylonitrile) are another type of nitrile which is useful in the new process, especially the soluble polyacrylonitriles and the like. Those having 10 to about 100 nitrile groups per molecule, for instance, are particularly useful. One or all of the nitrile groups, as desired, can be converted to a peroxycarboximidic acid group to serve as epoxidizing agent. When employing the polynitrile for in situ formation of the epoxidizing agent by reaction with hydrogen peroxide one will use mole proportions which take into account the number of nitrile groups present per mole of the starting nitrile.

Especially useful new peroxycarboximidic acids are those having the peroxycarboximide group

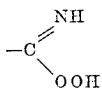

linked to a hydrocarbon radical of 1 to 18, more preferably 1 to 8 carbon atoms, which is free of non-aromatic multiple bonds.

The peroxycarboximidic acid can be made by separate reaction of the chosen nitrile with hydrogen peroxide followed by addition of the preformed peroxycarboximidic acid to the ethylenic compound to be epoxidized with intimate mixing under reaction conditions. It is not necessary in such a case to isolate the peroxycarboximidic acid in order to use it for the epoxidation in the presence of the required base. An alternative method of making preformed peroxycarboximidic acid epoxidizing agent for use in the reaction is by reacting an imido acid chloride

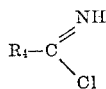

with a peroxide under basic conditions. Thus one can use hydrogen peroxide and a base, for instance, sodium hydroxide, or sodium peroxide, sodium perborate or the like can be used alone or with a base.

Whether preformed or made in situ at least one mole of the peroxycarboximidic acid is required in the new process per mole of epoxy group produced therewith. However, different mole proportions of ethylenic compound to peroxycarboximidic acid epoxidizing agent can be employed. It is often advantageous to employ a stoichiometric excess of one of the reactants in order to promote complete reaction of the other reactant at a faster rate. Generally ratios of about 0.25 to about 4 moles of ethylenic double bond per mole of peroxycarboximidic acid epoxidizing agent are used. As a rule it is preferred to use a mole excess of ethylenic double bond being epoxidized, ratios in the range of about 1.1 to about 2 moles per mole of the epoxidizing agent being usually most preferable. When the peroxycarboximidic acid is being formed in situ in the reaction mixture from a nitrile, mole ratios of nitrile to hydrogen peroxide of the order of about 0.5:1 to 4:1 can be used although preferably ratios of about 1:1 to about 3:1 and most preferably about 1.2:1 to about 2:1 are employed. In such cases about 0.25 to about 4 moles of ethylenic double bond per mole of hydrogen peroxide will be employed, more advantageously at least one mole of the ethylenic double bond being epoxidized per mole of hydrogen peroxide and preferably an excess proportion of the order of about 1.1:1 to about 2:1 with about 1 to about 2 equivalents of nitrile for each such ethylenic group.

The reaction is preferably carried out in the liquid phase using a mutual solvent for the reactants. Aqueous media are suitable especially when employing hydrogen peroxide in the reaction in the form of its more conveniently available aqueous solutions. Especially when epoxidizing ethylenic compounds of low solubility in water and/or using peroxycarboximidic acids which are substantially water-insoluble, an organic solvent for the reactants is useful instead of or together with water. Hydrocarbon solvents are one useful type of solvent, especially aromatic hydrocarbon solvents such as benzene, toluene and the xylenes and the like, although aliphatic hydrocarbon solvents such as pentane, hexane, cyclohexane, etc. can be used. Alcohols, particularly the water-soluble alcohols, are another group of solvents which are useful, especially the less reactive tertiary alcohols such, for instance, as tertiary butyl alcohol and the like, although other alcohols such as methanol, ethanol, isopropanol, isobutyl alcohol, allyl alcohol, methallyl alcohol, etc. can also be used. Polyhydric alcohols, for instance, ethylene glycol, 2-methyl-2,4-pentanediol, etc. can be similarly used, as can other non-acidic solvents such as ketones, ethers, esters and the like, for example, acetone, methyl ethyl ketone, cyclohexanone, diacetone alcohol, dimethyl ether, ethylene glycol monomethyl ether, ethylene glycol monoacetate, dioxane, etc. Non-reactive solvents, most preferably those which are free from polymerizable ethylenic linkages, are most advantageous. The best results are usually obtained when the reaction is carried out with amounts of liquid solvent or diluent such that the concentration of the reactants in the liquid mixture is not more than about 50% by weight and more preferably is not greater than about 30%.

For maintaining the pH of at least 4 when epoxidizing compounds which are not themselves sufficiently basic for this purpose, either an organic or an inorganic base can be added. Both soluble and substantially insoluble basic agents are effective, it being only necessary that the basic agent maintain the required pH. Because of their ready availability at low cost, basic inorganic compounds are generally advantageous. Suitable bases of this kind are, for instance, inorganic hydroxides, examples of which are the alkali and alkaline earth hydroxides such as sodium hydroxide, potassium hydroxide, ammonium hydroxide, magnesium hydroxide, calcium hydroxide, etc.; the corresponding oxides, for instance, sodium oxide, calcium or magnesium oxide and the like; and basic salts such as the water-soluble carbonates, bicarbonates, phosphates and the like; such, for instance, as sodium carbonate or bicarbonate, tripotassium phosphate, etc. Among the organic bases which can be used, although generally they are less to be preferred because of their higher cost, are, for instance, amines such as mono-, di- or trimethylamine, the corresponding ethyl and isopropyl amines, and the like, salts of phenols such as potassium and calcium phenates, sodium meta-methyl phenoxide, sodium naphthoxide, etc. There are operating advantages sometimes in using an insoluble form of basic compound. Anion exchange resins, especially amine or quaternary ammonium base resins, are a particularly convenient form of insoluble base for use in the new process. Examples of suitable base resins are, for instance, the amination products of chloromethylated styrene-divinylbenzene copolymers described in U.S. 2,591,573 and sold by Rohm and Haas as "Amberlite IRA-400" and "IRA-401"; resins made by the process of U.S. 2,388,235 and those sold by Dow Chemical Company as "Dowex 1"; anion resins such as "Triton-B," and the like. These may be used in the free base form or in the form of the salts, for instance, the carbonate salts of the strong base resins.

It has been found that the rate of reaction increases as the pH of the mixture is increased. A pH of at least about 6 is desirable in order to promote most rapid reaction and usually it is advantageous to maintain a pH of at least 7 and more advantageously at least 7.5 in the reaction mixture throughout the reaction. Excessively high pH is to be avoided since it tends to favor formation of undesirable byproduct. For this reason it is generally desirable to operate at a pH not greater than about 12 and more preferably at not above 10. Excellent results have been obtained by controlling the addition of basic agent so as to maintain the pH in the range of about 7 to about 9. The pH as here referred to is that determined with standard pH indicator paper which has been premoistened with distilled water when measuring the pH of reaction mixtures containing substantial amounts of organic solvents.

As a general rule the temperature of operation is not highly critical. Temperatures in the range of about 0° to about the boiling temperature of the mixture under the operating pressure can be employed, although temperatures of the order of about 20° to about 100° C. will usually be preferred. The higher the reaction temperature the shorter the reaction time which should be used for best results. Thus whereas times as long as about 24 hours or more may be used at about 0° C. or lower, less than 5 minutes' reaction time is desirable when the temperature is increased to 100° C. or higher. When using temperatures above the boiling point of one or both reactants it is preferred to operate under sufficient superatmospheric pressure to maintain the reactants at least partially in the liquid phase.

Batch, intermittent or continuous methods of reaction can be employed. The reactants can be introduced in any convenient order. One advantageous method of batchwise reaction when employing the preferred procedure of in situ formation of the percarboximidic acid epoxidizing agent comprises adding hydrogen peroxide, advantageously commercial aqueous hydrogen peroxide of about 30 to about 75% concentration, to a stirred mixture of the ethylenic compound being epoxidized, and an organic nitrile in a mutual solvent containing sufficient base to bring the initial pH within the required range. Preferably the mixture is cooled while the feed rate is controlled so as to maintain the desired reaction temperature. Additional base can also be fed as required to maintain the pH within the chosen range. It is feasible, however, to add all of the basic agent to the reaction mixture at the start of the reaction in this method of operation. Basic acting salts such as sodium bicarbonate, potassium phenoxide, sodium acetate, etc. are especially suitable for maintaining the desired pH in this way.

Alternatively the reaction can be carried out by charging preformed peroxycarboximidic acid and a suitable solvent of the previously indicated type to a stirred reactor provided with temperature control means, suitably an autoclave, preferably with the required base. Then the ethylenic compound to be epoxidized is fed in with or without additional basic agent as required to maintain the pH within the required range until a reactor charge has been completed. It is usually desirable to continue the stirring of the reaction mixture at the reaction temperature for a period after all of the reactants have been added in order to promote the desired degree of reaction.

The process can be carried out continuously in apparatus of the foregoing type, for example, by partially reacting an initial charge as described above, then continuously adding ethylenic compound, hydrogen peroxide, and organic nitrile separately to the reactor with continuous or intermittent addition of base in the required amount while continuously or intermittently withdrawing epoxide-containing reacted mixture from the reactor. The same result can be obtained, usually more advantageously, by using as the reactor a cooler with or without a time tank in series therewith and employing a pump to circulate reaction mixture therethrough as a continuously circulating stream into which the ethylenic compound being epoxidized, hydrogen peroxide, nitrile and basic agent are continuously fed at separate points sufficiently separated from the point of withdrawal of reaction mixture that substantial reaction is achieved before removal of the product-containing mixture from the reactor. Alternatively, the ethylenic compound can be fed at spaced points along the path of flow of the reaction mixture through a tubular or other suitable form of reactor in which the proper temperature is maintained. Temperature control can be achieved by external cooling or evaporation of a volatile component of the mixture, for instance, a liquefied gaseous hydrocarbon such as butane or isopentane, which can also serve at least in part as the solvent and/or diluent for the reactants, the pressure of the system being regulated so that this volatile component will evaporate at the chosen reaction temperature. As in the previously described modification of the process, hydroperoxide solution and/or a solution of the base being used can be fed, preferably separately, into the stream of reaction mixture at intermediate points between the points at which the ethylenic compound being epoxidized is fed. In any of these methods of operation one can substitute a feed stream of preformed peroxycarboximidic acid for the hydrogen peroxide and nitrile feeds. Advantageously, the peroxycarboximidic acid epoxidation agent is fed as the crude reaction mixture in which it is produced, preferably at the alkaline pH at which the epoxidation is preferably conducted as previously pointed out.

The epoxide produced can be recovered from the reaction mixture in any suitable manner, account being taken of the reactive nature of these compounds, especially the tendency of the epoxide ring to undergo hydration in to nitriles and recycled with or without conversion of the epoxide group in the process. As a general rule, however, epoxy amides will be of more value for other purposes.

In another variation of the invention which has special advantages, peroxycarboximidic acids from beta-hydroxynitriles made by reacting an epoxide with hydrogen cyanide are used to produce a beta-hydroxyamide as the chief product by recycling the epoxy coproduct to react with more hydrogen cyanide. The over-all reaction when using ethylene as the olefinic compound is then:

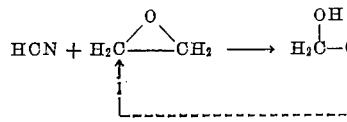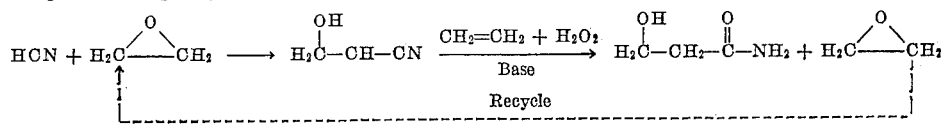

aqueous media, slowly under neutral conditions and more rapidly under acidic or basic conditions. One suitable method of recovering the epoxy product is by distillation. Depending on the relative boiling points of the epoxide and the amide which is obtained as a coproduct therewith, the amide can be recovered before or after distilling off the epoxide. Flash distillation under approximately neutral conditions, using reduced pressure, is a preferred method for recovering the epoxide with or without the amide as a rule at temperatures below 100° C. Temperatures between about 30° C. and about 60° C. are preferred for distillation of the less stable epoxide products. The time of exposure of the epoxide to elevated temperatures should be shorter the higher the temperature in order to minimize reactions, particularly hydration of the epoxy group when aqueous mixtures are being treated. The flashed epoxide will usually be found to be quite stable and can be advantageously used as recovered in aqueous solution or can be isolated in pure or substantially pure form.

Other methods of recovery such as extraction with ether or the like can also be used. Where the epoxide produced is desired as an intermediate for further synthesis, it is often advantageous to use the epoxidation mixture for this purpose without isolating the epoxides therefrom, although prior separation of the amide coproduct may be desirable. For example, where an epoxy alcohol is to be converted to the corresponding polyol by hydration of the epoxy group, it has been found that the hydration can be carried out successfully without flashing off the epoxide or amide coproduct from the epoxidation mixture. The hydration can be carried out under alkaline, neutral or acid conditions. A substantial excess of water is desirable for the hydration and preferably the reaction is carried out at an epoxide concentration of about 5 to about 25% by weight. Sufficient water may be present in the epoxidation mixture but it will usually be advantageous to add additional water. Heating the neutralized epoxidation mixture at 60° C. to 100° C. has been found to be one suitable method. Higher yields are generally obtained, however, by reaction with water under acid conditions, most preferably at a pH of about 0.5 to about 1.0. Although longer reaction times are required it is usually advantageous to carry out the acid hydration at a temperature of about 50° C. or below, most preferably at about room temperature, when using the epoxidation mixture for the reaction since higher yields can be obtained in this way.

The recovered amide coproduct of the reaction can be used in many known ways as a valuable compound. Under some circumstances, however, it may be found more convenient to convert the amide to a nitrile which can be recycled to the process to make more peroxycarboximidic acid epoxidizing agent for use in the new method of the invention. There are a number of methods available for carrying out this conversion. Reaction of the amide with phosphorus pentoxide or phosphorus pentachloride, for example, is one method which is especially suitable for use with non-epoxy amide coproducts of the reaction. Epoxy amide coproducts also can be converted Any of the ethylenic compounds useful in the previously described modifications of the invention can be used in this process in which beta-hydroxyamide is produced from an olefinic compound, hydrogen peroxide and hydrogen cyanide. One can, however, carry out the reaction with an ethylenic compound which does not correspond with the epoxide which is used to make the beta-hydroxynitrile and recover a valuable oxirane product as in the preceding modifications of the invention.

The new epoxidation process is further illustrated by the following examples showing some of the ways in which it can be advantageously carried out:

*Example I.—Epoxidation of Cyclohexene*

A mixture of cyclohexene (1.5 moles) and acetonitrile (2.0 moles) in 300 ml. of methanol solution was charged to a stirred reactor with sufficient 1 N sodium hydroxide to bring the pH to 10.0 as determined by pH meter (true pH by paper 8.5). Over a period of 2 hours there was slowly added 1.0 mole of 50% hydrogen peroxide while the temperature was maintained at 60° C. At the end of the addition, 83% of the theoretical peroxide had been consumed; in another 1½ hours the peroxide consumption was 97% of theory and the yield of epoxide was 82% based on peroxide consumed (titration by HCl-dioxane). Through the reaction, <1 mole percent of oxygen was evolved; the acidic by-product amounted to 4.5 mole percent. The epoxycyclohexane (63 grams) recovered by distillation of the reaction mixture had a boiling point of 130–131° C. and analyzed as follows: Calculated for $C_6H_{10}O$: Oxirane oxygen, 16.3. Found: Oxirane oxygen, 16.0. Bottoms from the distillation were recrystallized from chloroform to give 33 grams of acetamide, melting point 68–72° C.

*Example II.—Epoxidation of Cyclohexene Using an Aromatic Peroxycarboximidic Acid*

Cyclohexene (1.5 moles) was reacted by the method of Example I using benzonitrile (1.5 moles) in place of acetonitrile. The reaction was approximately ten times faster than with acetonitrile and a 93% conversion of hydrogen peroxide was obtained in six hours at 35° C. The yield of epoxycyclohexane was 83% based on the peroxide converted. Benzamide (89 grams, 0.74 mole), melting point 126–127° C., was recovered from the bottoms from the distillation.

*Example III.—Epoxidation of Hexene-1*

Using the method of Example I, hexene-1 (1.5 moles) was reacted with acetonitrile (1.5 moles) and hydrogen peroxide (1.0 mole) in methanol solution at 35°±1° C. and pH 9.5±0.1 was measured by meter (true pH 8). The rate of reaction was determined by hourly titrations for total peroxide. After six hours the reaction was 50% complete and the yield of 1,2-epoxyhexane was 87% based on peroxide consumed as determined by epoxide titration.

*Example IV.—Epoxidation of 2-Methylbutene-2*

2-methylbutene-2 (1.5 moles) was epoxidized by reaction with peroxyacetimidic acid formed in situ by the action of hydrogen peroxide (1 mole) on acetonitrile (1.5 mole) in methanol solution at pH 9.5±0.1 as determined electrometrically (true pH 8) and 35±1° C. The rate of reaction was the same as that in Example III and the yield was also 87%, based on peroxide consumed, after 6 hours reaction and 50% conversion of the peroxide.

Under the same conditions cyclohexene was epoxidized at the same rate, the pseudo first order rate constant being $1.7 \times 10^{-3}$ min.$^{-1}$ as was the case with hexene-1 also. This is in marked contrast to the peracetic acid epoxidation of hexene-1, cyclohexene, and 2-methylbutene-2 which gives relative rates of about 1:25:400. When cyclohexene was epoxidized under the same conditions but with the pH held at 10.5 (meter) instead of 9.5 the reaction was much faster, 2.5 hours being required at 35° C. for 89% consumption of peroxide. The yield of epoxide was 38%.

*Example V.—Epoxidation of Allyl Chloride*

Under the conditions of Example III an essentially quantitative yield of epichlorohydrin based on peroxide consumed was obtained in the epoxidation of allyl chloride in methanol solution when the reaction was carried to 40% completion. The pseudo first order rate constant was $1.0 \times 10^{-3}$ min.$^{-1}$ under these conditions.

When the reaction was carried out without the methanol solvent by reacting an aqueous suspension of allyl chloride (1.5 moles) with 50% hydrogen peroxide (1.0 mole) and acetonitrile (1.5 moles) at 35° C. and pH 8 to 8.5, the yield of epichlorohydrin was much lower at 77% conversion of peroxide obtained in seven hours reaction time.

*Example VI.—Epoxidation of Mesityl Oxide*

Mesityl oxide was epoxidized by hydrogen peroxide in methanol solution at an indicated pH of 9.5±0.1. Without added acetonitrile, the reaction was 60% complete in five hours. With nitrile added, the reaction was 86% complete in five hours. The epoxidation rate in this case was approximately 1.5 times the rate observed in the absence of nitrile.

*Example VII.—Epoxidation of Cyclohexene Using Trichloroacetonitrile*

When trichloroacetonitrile was substituted for acetonitrile in the method of Example I, 83% of the theoretical amount of peroxide was consumed in the first hour at 35° C. and an indicated pH of 5–5.5 (the true pH by paper was 4–5). Essentially no oxygen was evolved during the reaction, which was 94% complete after three hours. An epoxide value at that point indicated a yield of 56% of 1,2-epoxycyclohexane based on peroxide consumed.

*Example VIII.—Epoxidation of Bicycloheptadiene*

Bicycloheptadiene (1.0 mole) was epoxidized in 1½ hours at 60° C. by reaction with acetonitrile (1.0 mole) and hydrogen peroxide (0.5 mole) in methanol solution at pH about 8. About 5 mole percent of oxygen was evolved in the reaction. The bulk of the product was water-soluble, but ether extraction afforded 13 grams (24% yield) of product (boiling point 59–60°/20 mm.) having a carbon and hydrogen analysis in agreement with that of the monoepoxide:

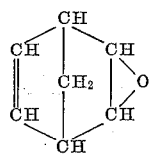

*Analysis.*—Calculated for $C_7H_8O$: C, 77.7; H, 7.5; oxirane oxygen, 14.8. Found: C, 77.3; H, 7.5; oxirane oxygen, 7.4 (HBr in acetic acid). Infrared analysis indicated the presence of some carbonylic impurity.

*Example IX.—Epoxidation of Styrene*

Styrene (1.5 moles) was epoxidized in 2.5 hours at 50° C. by reaction with acetonitrile (1.5 moles) and hydrogen peroxide (1.0 mole; added dropwise over one hour) in methanol solution at pH 8. Styrene oxide (50 grams, 42% yield), boiling point 99° (35 mm.); $n_D^{20}$ 1.5350, was secured by extraction and distillation.

*Example X.—Epoxidation of Cinnamaldehyde*

Using the method of Example II cinnamaldehyde in methanol solution is epoxidized by reaction with peroxybenzimidic acid in the presence of sufficient sodium hydroxide to bring the pH indicated by meter to about 9.5 to obtain 2,3-epoxy-3-phenylpropionaldehyde.

Under similar conditions allyl alcohol gives a good yield of glycidol.

*Example XI.—Epoxidation of Ethyl Crotonate*

To a stirred solution of 34 grams (0.30 mole) of freshly flashed ethyl crotonate and 31 grams (0.30 mole) of benzonitrile in 200 ml. of methanol was added dropwise over 2 hours at 45–50° C. a solution of 17 grams (0.25 mole) of 50% hydrogen peroxide in 50 ml. of methanol. The indicated pH (by meter) was held at 9–9.5 by the addition of 1 N sodium hydroxide as needed; the true pH as measured by indicator paper was 7.5–8.

At the end of the addition, a titration for peroxide indicated that 64% of it had been consumed; after another hour, the consumption was 74%. The mixture was allowed to stand overnight at room temperature without further alkali addition. It was then diluted with 300 ml. of water and extracted with three 100 ml. portions of chloroform. After washing and drying, the chloroform extracts were concentrated on the steam bath, cooled and filtered to remove some precipitated benzamide, and then distilled through a 0.7 x 50 cm. glass spiral-packed column at 50 mm. to give 8.8 grams of recovered ethyl crotonate, boiling point 60–65° C., and 8.6 grams of ethyl 2,3-epoxybutyrate, boiling point 88–92° C. (30% yield based on unrecovered ethyl crotonate). Some recovered benzonitrile, boiling point 102–103° (50 mm.) was also secured.

*Example XII.—Epoxidation of Butadiene*

Butadiene monoxide is obtained as the chief product when epoxidizing butadiene in liquid phase using peracetimidic acid under the conditions of Example I. On further epoxidation of the monoxide butadiene diepoxide, 1,2,3,4-diepoxybutane is produced.

In the same way $\Delta^3$-dihydropyran-3-methanol gives 3,4-epoxydihydropyran-3-methanol.

*Example XIII.—Oxidation of Vinyl n-Butyl Ether*

To a stirred solution of 150 grams (1.5 mole) of vinyl n-butyl ether and 62 grams (1.5 moles) of acetonitrile in 400 ml. of methanol was added over two hours 1.0 mole of 50% hydrogen peroxide. The temperature was held at 35° C. and the indicated pH (meter) maintained at 9.5–10.0 by the addition of 3 N aqueous sodium hydroxide. At the end of the addition, a titration for peroxide showed the presence of 0.74 mole. After a total of six hours at 35–40° C. there remained 0.16 mole of peroxide. A titration for epoxide HCl–MgCl₂) indicated the presence of 0.10 mole of butoxyethylene oxide.

The mixture was diluted with 1 liter of water and extracted thoroughly with ether. The combined ether extracts, after washing and drying, were concentrated on the steam bath. Distillation of the residue through a 0.7 x 50 cm. spiral packed column gave 49 grams of 2-methoxy-2-butoxyethanol, boiling point 75–76° C. (5 mm.); $n_D^{20}$ 1.4227. The yield was 40% based on hydrogen peroxide consumed.

*Analysis.*—Calculated for $C_7H_{16}O_3$: C, 56.7; H, 10.9; hydroxyl value, 0.68 equivalent/100 grams. Found: C, 56.8; H, 10.9; hydroxyl value, 0.68 equivalent/100 grams.

As applied to oxirane production the present invention is not limited to the foregoing examples but broadly comprises reacting an ethylenic compound having an ethylenic compound having an ethylenic double bond linking two carbon atoms to which are directly joined only members of the group consisting of hydrogen atoms and organic radicals which have their free bonds attached to carbon atoms, said radicals being joined to the carbon atoms of said ethylenic group by single bonds with a peroxycarboximidic acid or with hydrogen peroxide and a nitrile whereby the peroxycarboximidic acid is formed in the reaction mixture and recovering the resulting epoxy product. All of the very great number of ethylenic compounds known to be epoxidizable by reaction with other peroxy epoxidizing agents can be used in the present process. In addition to the compounds described by Swern in the article previously referred to as epoxidizable with percarboxylic acids one can successfully epoxidize by the present method any of the ethylenic compounds disclosed in U.S. Patent 2,785,185 as epoxidizable with acetaldehyde monoperacetate or the like. The new method has the advantage over these prior methods in being operative for the epoxidation of alpha, beta-ethylenic carbonyl compounds as well as those having an ethylenic group or groups further removed from the carbonyl group. Ethylenic hydrocarbon carbonyl compounds wherein the carbonyl group or groups are aldehyde, ketone, carboxylic acid, carboxylic acid ester, acid halide and/or amide groups are particularly useful starting compounds. The new method is especially useful for the epoxidation of these and other ethylenic compounds having from 3 to 57 carbon atoms per molecule. Starting ethylenic compounds with 57 carbon atoms are exemplified by the glycerides of higher fatty acids such as oleic acid and the like which are a group of compounds particularly suitable for use in the new process when carried out in an aromatic hydrocarbon solvent such as benzene, etc. The acids, esters and amides containing a long chain unsaturated aliphatic group used in the process of U.S. 2,813,878 can likewise be epoxidized advantageously by the method of the present invention.

Ethylenic compounds having a terminal ethylenic linkage are an especially useful subgroup of starting materials for epoxidation by the new method. Those having 3 to 20 carbon atoms per molecule are a particularly useful subgroup. This new method not only permits epoxidation of these compounds at the same fast rate as those with non-terminal double bonds which is an important improvement over prior epoxidation methods, but also it makes it feasible to simultaneously epoxidize both terminal and non-terminal ethylenic groups in compounds having one or more of each of these types of bonds in the molecule. Thus the method of the invention, in contrast to that of U.S. 2,779,771 in which a percarboxylic acid is used as epoxidation catalyst gives the glycidyl ester of diepoxystearic acid instead of the allyl ester when epoxidizing allyl linoleate. It also makes it feasible to produce 4,5,6,7-diepoxides from the unsaturated steroids of U.S. 2,738,348 without resort to the prolonged reaction which is described as necessary in the method of the patent.

It will thus be seen that the invention offers many advantages in the production of oxirane compounds and is capable of considerable variation not only with respect to the ethylenic compounds or mixtures thereof which can be epoxidized and the new peroxycarboximidic acid oxidizing agents which can be employed, but also in regard to the procedure used in carrying out the new process. However, as previously pointed out the invention is not restricted to these illustrative examples nor by any theory proposed in explanation of the improved results which are obtained.

We claim as our invention:

1. In a process for making an oxirane compound by epoxidizing an ethylenically unsaturated compound having as the only aliphatic carbon-to-carbon unsaturation up to 2 olefinic double bonds, said compound being selected from the group consisting of a hydrocarbon, and a hydrocarbon chloride, aldehyde, ketone, alcohol, ether, carboxylic acid, carboxylic acid ester, acid halide, and amide, said compound having from 3 to 57 carbon atoms, the improvement which comprises reacting said ethylenic compound at a pH of at least 4 with peroxycarboximidic acid of the formula

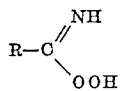

where R is hydrocarbon of 1 to 18 carbon atoms containing only aromatic ring double bonds as multiple bonds between carbon atoms.

2. A process in accordance with claim 1 in which the peroxycarboximidic acid is formed in the reaction mixture from the corresponding nitrile and hydrogen peroxide.

3. A process in accordance with claim 2 wherein the nitrile is a saturated hydrocarbon nitrile.

4. A process in accordance with claim 2 wherein the nitrile is an aromatic hydrocarbon nitrile.

5. A process in accordance with claim 4 wherein the nitrile has the nitrile group directly linked to the aromatic ring.

6. In a process for making an oxirane-substituted hydrocarbon by epoxidizing an ethylenic hydrocarbon having as the only aliphatic carbon-to-carbon unsaturation up to two olefinic double bonds and containing from 3 to 57 carbon atoms per molecule, the improvement which comprises reacting said ethylenic hydrocarbon at a pH between about 7 and about 12 with hydrogen peroxide and a mononitrile-substituted hydrocarbon of 2 to 19 carbon atoms per molecule containing only aromatic ring double bonds as multiple bonds between carbon atoms using a temperature of about 0° to about the boiling temperature of the mixture under the operating pressure and mole ratios of nitrile to $H_2O_2$ of about 0.5:1 to 4:1 and about 0.25 to about 4 moles of ethylenic hydrocarbon per mole of $H_2O_2$.

7. A process in accordance with claim 3 wherein the ethylenic hydrocarbon which is epoxidized contains a terminal ethylenic linkage.

8. In a process for making an oxirane-substituted glyceride by epoxidizing a glyceride of an ethylenic fatty acid having as the only aliphatic carbon-to-carbon unsaturation up to two olefinic double bonds, which glyceride contains up to 57 carbon atoms per molecule, the improvement which comprises reacting said ethylenic glyceride at a pH between about 7 and about 12 with hydrogen peroxide and a mononitrile-substituted hydrocarbon of 2 to 19 carbon atoms per molecule containing only aromatic ring double bonds as multiple bonds between carbon atoms using a temperature of about 0° to about the boiling temperature of the mixture under the operating pressure and mole ratios of nitrile to $H_2O_2$ of about 0.5:1 to 4:1 and about 0.25 to about 4 moles of ethylenic glyceride per mole of $H_2O_2$.

References Cited in the file of this patent

UNITED STATES PATENTS 2,347,434    Reichert et al. _____ Apr. 25, 1944

(Other references on following page)

UNITED STATES PATENTS

| | | |
|---|---|---|
| 2,469,847 | Rumscheidt et al. | May 10, 1949 |
| 2,500,599 | Bergsteinsson et al. | Mar. 14, 1950 |
| 2,745,848 | Greenspan et al. | May 15, 1956 |
| 2,754,325 | Smith | July 10, 1956 |
| 2,813,878 | Wahlroos | Nov. 19, 1957 |
| 2,813,896 | Krimm | Nov. 19, 1957 |
| 2,838,524 | Wilson | June 10, 1958 |
| 2,873,283 | Yang | Feb. 10, 1959 |

OTHER REFERENCES

Henderson et al.: Chem. Soc. Journ., vol. 97, pp. 1659–1669 (1910).

McMaster et al.: JACS, vol. 39, pp. 103–109 (1917).

Swern: Chem. Reviews, vol. 45, pp. 1–68 (1949) (pages 1–25, 30, 33 and 38 relied on).

Condensed Chemical Dictionary, 5th Ed., 1956, p. 837, Reinhold Pub. Corp., N.Y.